…

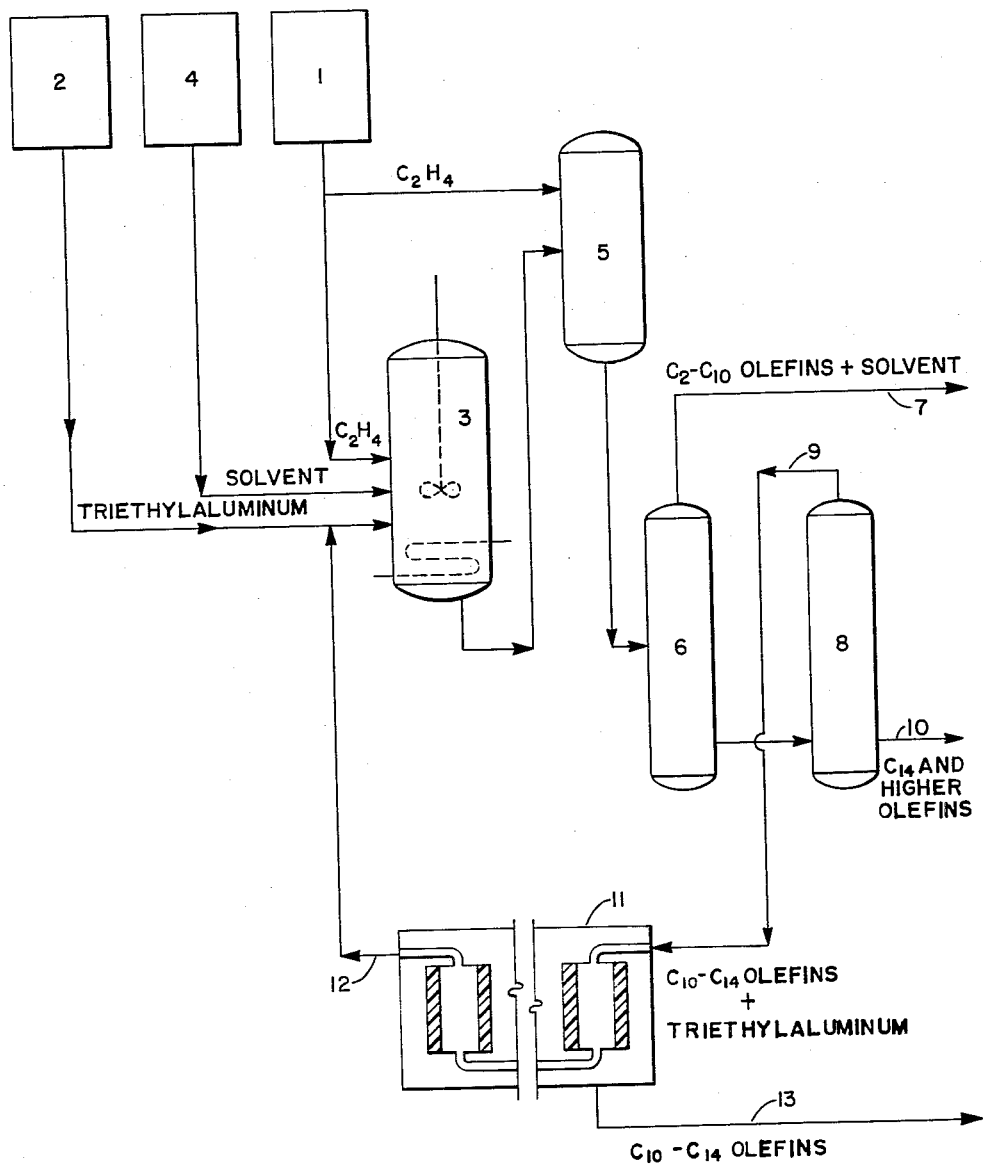

United States Patent Office 3,149,179
Patented Sept. 15, 1964

3,149,179
SEPARATION OF TRIETHYLALUMINUM FROM OLEFIN MIXTURES BY MEANS OF MEMBRANE PERMEATION
Jimmie R. Bowden, Needham Heights, Mass., assignor to Continental Oil Company, Ponca City, Okla., a corporation of Delaware
Filed June 30, 1960, Ser. No. 39,936
10 Claims. (Cl. 260—683.15)

This invention relates to an improved method for the separation of hydrocarbons from relatively large amounts of complex organo-metallic compounds dissolved therein. More particularly, this invention pertains to a dialysis method for effecting fractionation of a solution of an olefinic material and a metal alkyl. Still more particularly, the present invention relates to the separation of normally liquid alpha-olefins from a solute comprising lower trialkylaluminum compounds by contacting a semi-permeable membrane with said solution and thereby effecting preferential permeation of the alpha-olefins therethrough.

Intermediate and high molecular weight alpha-olefins presently constitute an important class of chemical substances. These materials, for instance, are used extensively to alkylate aromatic materials such as benzene or naphthalene which alkylation derivatives are then sulfonated to yield products having excellent detergency characteristics. In the preparation of detergent products of this type it is known that the linearity of the olefinically derived substituent results in certain beneficial detergency properties. One of the most effective ways of producing the particularly desirable straight chain alpha-olefins consists of a known method involving the reaction of aluminum alkyls with a low molecular weight olefin, such as ethylene and propylene, via a growth process whereby the olefinic monomer progressively adds to the alkyl substituents of the aluminum molecule. When the growth reaction has progressed to a desired point the alkyl substituents of the aluminum are converted into olefinic compounds by reacting the growth product with a low molecular olefin, usually ethylene, in the presence of a nickel catalyst. The latter reaction is conventionally known as a displacement reaction. The displacement reaction yields a reaction mixture comprising the desired high molecular weight olefin product and a trialkylaluminum, the latter being triethylaluminum when ethylene is utilized in the displacement reaction.

There are several ways in which the long chain alpha-olefin can be recovered from the mixture thereof with the regenerated short chain aluminum trialkyl. One such method consists of destroying the aluminum trialkyl by hydrolysis or other suitable means so as to permit ready recovery of the olefinic product. The short-coming of this method is that it represents an economical waste insofar as the aluminum alkyl if recovered as such could be recycled and accordingly reused in the growth reaction.

Another practiced method of recovering the olefinic product additionally provides for the recovery of the regenerated aluminum alkyl. This latter method is accomplished by fractionally distilling the displacement reaction mixture. However, because of the similarity of boiling ranges of the aluminum alkyl to several of the olefinic components present, separation in this manner is a very tedious and consequently expensive operation. Furthermore, the elevated temperatures necessary to effect separation in this manner is likely to deleteriously affect a substantial amount of the recovered aluminum alkyl because of the temperature sensitivity of these organo-metallic compounds.

In accordance with this invention there is provided an improved method for effecting separation of mixtures of regenerated aluminum alkyls and olefinic materials such as obtained in the above-described displacement reaction. I have found that the desired segregation of the components fractions of these mixtures can be readily effected by a dialysis or selective permeation process. In spite of the complete physical homogeneity of these mixtures there is, fortuitously, sufficient difference in the molecular structure of the components present so as to permit preferential passage of the olefinic component through certain permeation membranes. The non-permeated fraction containing a high percentage of the aluminum alkyls can then be economically reused to prepare additional quantities of a growth reaction product. More specific details with respect to the present dialysis method for accomplishing said separation will be given subsequent to a further discussion of the growth method for preparing high molecular weight alpha-olefins.

The growth reaction is depicted schematically by the following equation in which triethylaluminum is illustratively utilized as the organo-aluminum compound and ethylene is illustratively employed as the monomeric olefin:

(1)

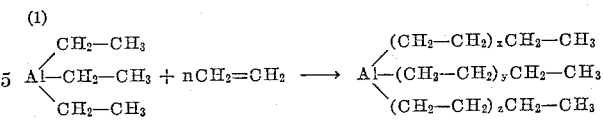

where $x$, $y$ and $z$ can be 0 or an integer ranging up to about 14 and where $x+y+z=n$.

The reaction in accordance with the above equation can be conveniently carried out by passing the ethylene through the triethylaluminum preferably in the presence of a nonreactive diluent capable of dissolving the reactants. A wide variety of reaction conditions can be utilized to accomplish the growth reaction. For example, a temperature within the range of from about 65 to 150° C. and a pressure within the range of from about 200 to 5000 p.s.i. can be used. More preferably, limits of these respective conditions include a temperature range of from about 90° to 120° C. and a pressure range from about 1000 to 3500 p.s.i. The reaction is not limited to the use of triethylaluminum as shown, for as inferred above, other low molecular alkylaluminum compounds can also be advantageously used. Examples of such suitable alkylaluminum compounds include: tripropylaluminum, tributylaluminum, triisobutylaluminum, diethylaluminum hydride, ethylaluminum dihydride and the like. In place of ethylene as shown in the above reaction, other low molecular aliphatic mono-1-olefins such as propylene can be used. Generally, $C_2$ to $C_4$ olefins are preferred as the growth facilitating hydrocarbon compound.

The growth reaction is a comparatively slow process and the progress of the reaction can be readily followed. After the desired degree of growth is realized, the olefinic products are obtained by heating the growth reaction product with additional amounts of a low molecular weight mono-1-olefin, generally corresponding to the olefin employed in the growth reaction, in the presence of a catalyst capable of effecting the displacement reaction. The displacement reaction temperature generally ranges from about 50 to 150° C. The time for accomplishing the displacement reaction employing temperatures within the range stated varies from as low as 1 to as high as 30 minutes. The displacement reaction is schematically illustrated by the following equation:

(2)

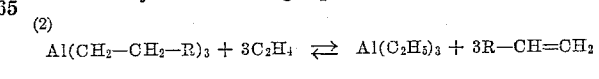

wherein $R=H$, $C_2H_5$, $C_4H_9$, $C_6H_{13}$, etc.

Suitable catalysts for use in the displacement reaction include the so-called reduction catalysts such as nickel, cobalt, palladium and certain iron compounds. The preferred catalyst is either nickel or a nickel compound capable of reacting with the trialkylaluminum growth product. Cobalt and cobalt compounds are almost equally effective as their nickel counterparts in catalyzing the above reaction. Specific nickel catalysts include finely divided metallic nickel, Raney nickel, nickel acetylacetonate, nickel naphthenate, etc. Amounts of catalyst can be varied over wide limits; however, usually the catalyst is employed in amounts from about 0.001 to 0.1% based on the weight of the growth product present.

The use of trialkylaluminums in the growth reaction is merely given by way of convenient illustration. Other organo-aluminum compounds can also be used. For example, aluminum compounds of the following formula are suitable:

$$AlR_2OR'$$

wherein R' is a hydrocarbon group which can be either alkyl, cycloalkyl, aryl, alkaryl, aralkyl, etc. The group represented by R is desirably a lower alkyl substituent and preferably either ethyl or propyl.

In addition to the aluminum alkoxy compounds indicated, organo-aluminum compounds having the following formula can likewise be used:

$$AlR_2SR'$$

wherein R and R' correspond to the groups of like designation defined in connection with the aluminum alkoxy compounds.

The gist of the present invention, as previously indicated, pertains to the dialysis method for separting components of a homogeneous mixture of a normally liquid alpha-olefin and organo-metallic compounds. Therefore, the particulars of this novel aspect of the instant teaching will be presented in context with a practical embodiment of a process wherein the desiderata provided by my invention are encountered, namely, in the manufacture of high molecular weight, substantially linear alpha-olefins. The accompanying drawing illustrates schematically such a process. Before considering this illustrative process it bears emphasizing that the details enumerated therein are not to be construed as a limitation on the invention except as indicated in the appended claims.

More particularly with reference to said drawing, ethylene from source (1) and triethylaluminum from source (2) are introduced into the growth reactor vessel (3) along with a suitable solvent, e.g., n-decane, xylene, etc., from source (4) capable of effecting a compatible liquid phase system of the reactive components within said vessel. The growth reactor contents are maintained at selected conditions of pressure and temperature in accordance with that stated generally hereinabove. After a desired degree of growth has been effected in the reactor (3), the growth product dissolved in the inert solvent selected is introduced into the displacement reactor (5). The displacement reaction is carried out in accordance with the equation (2) given above in the presence of a suitable quantity of nickel catalyst, all as described in this regard hereinabove.

The effluent of the displacement reactor consisting of aluminum alkyl (essentially triethylaluminum), straight chain alpha-olefins of a variety of molecular weights and solvent is conducted to a primary fractionator (6) wherein there is removed the light olefins ($C_2$–$C_{10}$) contained in the displacement reactor effluent. Additionally in said primary fractionator, the solvent is entrained overhead together with the light olefins fraction. The bottoms from the primary fractionator is then fed to a secondary fractionator (8) which unit effects a separation of an overhead cut (9) containing intermediate molecular weight alpha-olefins, normally having a carbon chain content ranging from about 10 to 14, and the aluminum alkyl carry-over from the displacement reactor. The bottom fraction (10) consisting mainly of heavy olefins, that is, about $C_{14}$ or greater, is conducted to a suitable storage facility pending further fractionation if desired. The overhead cut from the secondary fractionator (8) is fed into the unit (11) which comprises an assembly of a plurality of permeation cells.

Apart from the preferred type of membrane used in the permeation cells, the dialysis conditions necessary for a successful separation of the trialkylaluminum in combination with the intermediate molecular weight olefins can be briefly said to consist of maintaining a concentration gradient between the incoming feed (9) contacting the permeation membranes and the permeated material opposite of the contact side of said membranes. In other words the composition of the introduced mixture (9) must be kept reasonably uniform throughout so that the concentration of the more rapidly permeating components (the alpha-olefins) is not depleted in that part of the mixture in contact or proximately near the surface of the membrane. On the other hand, the concentration of the permeated component (alpha-olefin) is kept as low as possible on the opposite (exit) side of the membranes so that the direction of permeation will not be reversed to any appreciable extent.

The said required uniformity of the introduced mixture (9), specifically the mixture of triethylaluminum and intermediate molecular weight alpha-olefins, may be maintained in one of several ways. For instance, the mixture may be kept in a liquid state and subjected to a considerable amount of mechanical agitation so as to keep the composition of the mixture reasonably constant throughout. Less preferably, the membrane can be used in such thicknesses as to be fairly impermeable thereby causing a rate of permeation through the membrane slow enough so that the composition of the total non-permeate is kept uniform throughout by defusion.

The concentration of the more rapidly permeating mixture, in this instance the intermediate molecular weight alpha-olefins, can be kept at a minimum on the exit side of the membrane also in several ways. The most practical manner of accomplishing this objective consists of maintaining the permeate zone of the permeation cell system at a low enough pressure so as to effect rapid evaporation of the permeate emanating into said zone.

As can be readily appreciated, if a substantial plurality of permeation cells are employed the dialyzate can be maintained in a state of flow over the permeation membranes which obviates the need for the measures indicated above for maintaining uniform composition of the dialyzate under more or less static conditions of flow. Additionally the use of a substantial plurality of cells provides the optimum condition for effecting efficient separation, namely, that of maintaining the maximum area of dialyzing membrane relative to the volume of dialyzate supplied to the permeation cell assembly.

In general the dialyzate should be maintained at the highest temperature possible consistent with the sensitivity of the triethylaluminum present and the heat-resistant characteristics of the membrane used. Suitable temperatures range from about 35° C. to 120° C. for the preferred membranes enumerated hereinbelow.

Because of the high chemical reactivity of aluminum alkyls the choice of suitable permeable membranes for practicing the process of this invention is subject to a definite preference. The preferred membranes are those selected from synthetically derived plastics which are predominantly hydrocarbon in nature. Especially exemplary of this class of plastics are the polyolefins, and more particularly polyethylene including the low density and high density varieties thereof. Polypropylene or copolymers of ethylene and propylene are equally suitable from the standpoint of performance in the instant process. Polyperfluoro olefins can likewise be used. Any of these olefinic plastics can be irradiated in accordance with methods known in the art so as to improve their mechanical strength properties.

Less desirable than the above-mentioned plastic, but nevertheless suitable, are membranes prepared from polyamides, polyethers, etc. A host of other plastics can be used, such as the polyvinyl and polyester compositions, provided they exhibit a reasonable degree of heat-resistant properties. However, these types of compositions are not preferred primarily because of their more pronounced chemical reactivity and consequently inability to function properly under extended use.

The membrane should be as thin as possible in order to permit high permeation rates but the thickness must be reconciled against the strength and stability requirements of such membranes in the present permeation process. In general, the thickness of the membranes can vary from about 0.01 to 10 mils or somewhat more. The more suitable permeation cell assemblies for the practice of this invention are those in which the membranes are supported by substantially rigid bases or supports which in themselves are completely porous. Examples of such supports include fine mesh wire screen, porous sintered metals or ceramic materials. The particular manner of constructing multiple permeation cell assemblies suitable for the practice of this invention are well within the skill of those versed in this art.

The non-permeate efflux (12) from the permeation cell assembly (11) having a high concentration of aluminum alkyls is then recycled to the growth reactor (3) and in repetition of the process cycle there is again introduced from source (2) only a sufficient amount of triethylaluminum to make up for the loss of the triethylaluminum encountered in the preceding cycle. The permeate (13) leaving the permeation cell unit (11) consisting predominately of intermediate molecular weight alpha-olefins is then conducted to suitable storage facilities. Usually it is desirable to rid this fraction of any contained aluminum alkyls by the usual destruction methods before storing this fraction.

I claim:

1. A process for separating a homogeneous liquid mixture of substantially linear olefins and aluminum compounds containing substituents selected from the group consisting of alkyl, —O—alkyl and —S—alkyl which comprises contacting under dialysis conditions a chemically resistant, semi-permeable plastic membrane with said mixture and recovering as the permeate an olefinic fraction containing a substantially lower concentration of said aluminum compound than that initially present in said mixture.

2. A process for separating a homogeneous mixture of substantially linear alpha-olefins having carbon chain lengths between about 10 and 14 and alkylaluminum compounds having alkyl substituents containing not in excess of about 4 carbon atoms which comprises contacting under dialysis conditions a chemically resistant semi-permeable plastic membrane with said mixture and recovering as the permeate an olefinic fraction containing a substantially lower concentration of said alklyaluminum compounds than that initially present in said mixture.

3. A process according to claim 2 wherein said membrane comprises a polyolefin.

4. A process according to claim 2 wherein said membrane is polyethylene.

5. A process for separating a homogeneous mixture of substantially linear alpha-olefins having carbon chain lengths between about 10 and 14 and organo-metallic compounds consisting essentially of triethylaluminum which comprises contacting under dialysis conditions a semi-permeable polyolefin membrane with said mixture maintained at a temperature between about 35° C. and 120° C. and recovering as the permeate an alpha-olefin fraction containing a substantially lower concentration of said trialkyl-aluminum compounds than that initially present in said mixture.

6. A process according to claim 5 wherein said polyolefin membrane is polyethylene.

7. In a process for the manufacture of alpha-olefins whereby an aluminum compound containing substituents selected from the group consisting of alkyl, —O—alkyl, and —S—alkyl is reacted with a low molecular weight mono-1-olefin to provide a growth product, which growth product is then reacted with an additional quantity of a low molecular weight mono-1-olefin to yield a reaction mixture of said alpha-olefins and a displacement product consisting essentially of an alkylaluminum compound wherein the alkyl portion thereof corresponds in carbon chain length to that of the mono-olefin employed in the displacement reaction; the improvement of effecting separation of said alpha-olefins from said displacement product which comprises contacting under dialysis conditions a chemically resistant, semi-permeable plastic membrane with said mixture and recovering as the permeate alpha-olefins containing a substantially lower concentration of said displacement product than is present in said mixture.

8. In a process for the manufacture of alpha-olefins whereby an organo-aluminum compounds is reacted with ethylene to provide a growth product, which growth product is then reacted with a low molecular weight mono-1-olefin selected from the group consisting of ethylene and propylene to yield a reaction mixture of said alpha-olefins and a displacement product consisting essentially of a member selected from the group consisting of triethylaluminum and tripropylaluminum; the improvement of effecting separation of said alpha-olefins from said displacement product which comprises contacting under dialysis conditions a chemically resistant, semi-permeable plastic membrane with said mixture and recovering as the permeate alpha-olefins containing a substantially lower concentration of said displacement product than is present in said mixture.

9. A process according to claim 8 wherein said membrane comprises a polyolefin.

10. A process according to claim 8 wherein said membrane is polyethylene.

References Cited in the file of this patent

UNITED STATES PATENTS

| | | |
|---|---|---|
| 2,440,498 | Young et al. | Apr. 27, 1948 |
| 2,477,290 | Dornte et al. | July 26, 1949 |
| 2,781,410 | Ziegler et al. | Feb. 12, 1957 |
| 2,913,507 | Binning et al. | Nov. 17, 1959 |
| 2,969,408 | Nowlin et al. | Jan. 24, 1961 |